United States Patent [19]

Fujii et al.

[11] Patent Number: 4,832,847
[45] Date of Patent: May 23, 1989

[54] PROCESS FOR ACTIVATED-SLUDGE TREATMENT OF SEWAGE OR INDUSTRIAL WASTE WATER

[75] Inventors: Masahiro Fujii, Kitakyushu; Eiichi Nakamura, Tsukuba, both of Japan

[73] Assignee: Nippon Steel Corporation, Tokyo, Japan

[21] Appl. No.: 82,356

[22] Filed: Aug. 6, 1987

[30] Foreign Application Priority Data

Aug. 6, 1986 [JP] Japan ................. 61-184934
Aug. 6, 1986 [JP] Japan ................. 61-184935

[51] Int. Cl.$^4$ .................... C02F 3/08; C02F 3/10
[52] U.S. Cl. ................... 210/616; 210/617; 210/150
[58] Field of Search ............ 210/616, 150, 151, 617, 210/618, 631, 615

[56] References Cited

U.S. PATENT DOCUMENTS 4,333,893 6/1982 Clyde ................... 210/150

FOREIGN PATENT DOCUMENTS 3327774 2/1985 Fed. Rep. of Germany ...... 210/615
59-80393 5/1984 Japan ................. 210/616
61-136490 6/1986 Japan ................. 210/150
61-157396 7/1986 Japan ................. 210/151
324222 2/1972 U.S.S.R. ............... 210/616
983077 12/1982 U.S.S.R. ............... 210/151
1402187 8/1975 United Kingdom ........ 210/150

OTHER PUBLICATIONS

Arthur, Robert M.; "New Concepts and Practices in Activated Sludge Process Control"; Arthur Technology Inc. (1982) pp. 64–66.

Primary Examiner—Benoît Castel
Attorney, Agent, or Firm—Wenderoth, Lind & Ponack

[57] ABSTRACT

A fluidized-bed type activated-sludge treatment of sewage or industrial waste water characterized in that a fine powder of a granulated blast furnace slag is added to an aeration tank of the activated-sludge treatment installation to facilitate the treatment. In a fixed-bed type activated-sludge treatment of the sewage or industrial waste water, the granulated blast furnace constitutes the main constituent element of a ceramic material to be mounted in the aeration tank so as to serve as a fixing carrier for the activated sludge.

3 Claims, 1 Drawing Sheet

PROCESS FOR ACTIVATED-SLUDGE TREATMENT OF SEWAGE OR INDUSTRIAL WASTE WATER

BACKGROUND OF THE INVENTION

1. Field of the Invention:

The present invention relates to a process for an activated-sludge treatment of sewage or industrial waste water, and more particularly to one in which a novel fixing carrier for the activated sludge is employed to realize a high-efficiency activated-sludge treatment of the sewage or industrial waste water.

2. Description of the Prior Art:

For example, as for the sewage, the activated-sludge treatment thereof is generally conducted as follows:

The sewage accumulated in a sewage-treatment plant passes through a sand-sedimentation tank and a primary-sedimentation tank so that most of grit and coarse suspended matter is removed. After that, the sewage is allowed to flow into an aeration tank of an activated-sludge treatment process so that pollutants of the sewage are decomposed. Then, aeration tank effluent flows to a final sludge thickener (sludge-settling tank) in which the activated sludge is precipitated/separated, and the thickener effluent is subjected to a chlorination-treatment and the like and then discharged. On the other hand, a part of the activated sludge having been precipitated in the final sludge thickener is returned to the aeration tank as a return sludge, while the remaining part of such activated sludge is taken out and subjected to a methane-fermentation treatment, an incineration treatment and the like so as to be discarded.

Such activated-sludge treatment of sewage suffers from many problems. For example, the activated sludge produced in the treatment of the sewage is high in SVI (Sludge Volume Index), which leads to a difficulty in obtaining in the final sludge thickener a precipitated or settled sludge which is excellent in consolidation properties. In addition, the activated-sludge treatment has a defect in that when the treatment is conducted under a high-load condition or with a large load variation, or when thread like bacteria (hypomycetes) are developed in the activated sludge, the activated sludge suffers from bulking which leads to a poor settlement of the activated sludge. Consequently, it is hard for a conventional activated-sludge treatment of sewage to keep the activated sludge of the aeration tank in high concentration, which leads to limits of improvement of the treatment in its efficiency or in reduction of the time needed for conducting the treatment and compactness of the installations for conducting the treatment. Further, occurrence of bulking causes the activated sludge, which flows out of a sludge-settling tank, to lead to deterioration of the quality of the activated sludge effluent. As a result, under the conventional activated-sludge treatment, sewage disposal plants must be constructed in large-scale areas. In addition, it is hard to simplify the process of the treatment and it is also hard it to attain compactness of the installations of the treatment. Consequently, a considerable cost is needed for constructing a sewage disposal plant.

As a measure for resolving such inherent problems in the disposal of sewage, there is required a high-efficiency activated-sludge treatment technique to be developed.

As for the sewage or industrial waste water, hitherto, as an activated-sludge treatment process of high efficiency, there is provided a process for maintaining the activated sludge of the aeration tank in a high concentrations condition, which process is classified into a fluidized-bed system and a fixed bed system.

In the fluidized-bed system of the process, an example of which is disclosed in Japanese Laid-Open Patent Publication No. 61-136491, fine particles of grit such as diatomaceous earth, sand, ceramics and the like, or particles of activated carbon, or particles of organic high-molecular compounds are added to the aeration tank so as to be fluidized by aeration to cause the activated sludge to adhere to these particles, so that the activated sludge is improved in its settleability and maintained in a high concentration in the aeration tank.

In the fixed-bed system of such process, an example of which is disclosed in Japanese Laid-Open Patent Publication No. 61-136490, ceramic articles serve as the fixing carriers for the activated sludge. In this system, any honeycomb tube made of organic high-molecular compounds, multi-layer boards, ceramic articles and the like is immersed in the aeration tank to cause the activated sludge to adhere thereto, so that the activated sludge is fixed to the tube.

However, these conventional processes suffer from many problems. First, in a fluidized-bed system of the process employing fine inorganic particles, since the affinity of the activated sludge with such fine inorganic particles is not sufficient, it is required that the activated sludge adhere to such fine particles for an extended period of time in a stable manner. In addition, there is still not sufficiently established a process for treating the activated sludge having adhered to such carrier, an excess amount of sludge. Further, in the case of powdered activated carbon and particles of organic high-molecular compounds being employed in the fluidized-bed system of the process, since the affinity of the activated sludge with these particles is large, it is possible for the activated sludge to adhere to such particles in a stable manner. However, in the case wherein the excess sludge, having been treated through such process, is further treated through a methane-fermentation treatment, it is impossible to reutilized these particles after completion of methane fermentation of the excess sludge, since techniques for reutilizing such particles are still not sufficiently established. Further, in case that the disposal of the excess sludge is conducted through incineration, these carrier particles cause the cost of the sewage treatment to increase relative to the case wherein the inorganic-carrier particles are employed.

On the other hand, in a fixed-bed system in which a honeycomb tube of organic high-molecular compounds is used, the laminated boards and the like serve as fixed-bed type carriers for the activated sludge, since the affinity of the activated sludge with these carriers is large, the activated sludge having been proliferated adheres to these carrier, so that it is apt to cause them to clog. Consequently, in this case, it is necessary for the carriers to be frequently taken out of the aeration tank and cleaned through rinsing and the like so as to be regenerated. However, since the fixed bed is generally complex in construction while the affinity of the activated sludge with the carriers is large, it isnot possible, by a simple rinsing, to regenerate the carriers. Consequently, in order to regenerate such carriers, it is required a cumbersome treatment of the carriers. Further, in a process in which the conventional ceramic articles serve as the fixing carrier for the activated sludge, the firing temperatures of such ceramic articles are considerably high due to the increased cost cost of manufacturing, while conventional ceramic articles are not necessarily sufficient in fixing the activated sludge thereto. As described above, conventional carriers for fixing the activated sludge are not sufficient in affinity to the activated sludge, and therefore the reutilization properties, handling properties and are not adequate and cost high for treating huge amounts of the activated sludge. In the above, although the treatment of the sewage is described, the same problems as pointed out in the above description appear in the treatment of other waste water or industrial waste water, for example such as ammonia liquors discharged from coke ovens of the ironworks, waste water discharged from coal-gasification or liquefaction plants, waste water produced in the petroleum-refining process, waste water discharged from food-processing plants, waste water discharged from fermentation plants of alcohol and the like, and like waste waters.

SUMMARY OF THE INVENTION

It is an object of the present invention to provide a process for the high-efficiency treatment of the activated sludge of sewage or industrial waste water by the use of a novel fixing carrier or activated sludge for resolving the problems inherent in a conventional fixing carrier for activated sludge employed in conventional activated-sludge treatments of sewage or industrial waste water.

In the course a research as to the the high-efficiency activated-sludge treatment of sewage, the inventors of the present invention noticed that granulated blast furnace slag, which is a by-product originating from the blast furnaces of ironworks and having been suddenly chilled by water, has a good adherability in its shape or construction and composition as to the activated sludge, and then continued their research to find out that granulated blast furnace slag improves the settleability of activated sludge and has a remarkable effect in keeping the activated sludge in a high concentration condition when employed as the fixing carrier for activated sludge, which enables the granulated blast furnaces slag to be an excellent fixing carrier for activated sludge.

In addition, the inventors of the present invention have also found out that granulated blast furnace slag is provided with another effect in that it keeps the pH level of the aeration tank within a range suitable for treatment of the activated sludge when added to the aeration tank carrier for fixing the activated sludge. Consequently, by the use of the granulated blast furnace slag, it is possible to prevent the activated-sludge treatment from falling into poor operating conditions due to pH-level variations, which lead to a stable treatment of sewage.

The present invention is made on the basis of the above finding. The activated-sludge treatment of the sewage or industrial waste water according to the present invention is characterized in that a ceramic article mainly constructed of granulated blast furnace slag or fine powder thereof is employoed as the fixing carrier for the activated sludge, while serving to control the oxidation-reduction potential (ORP) of the aeration tank so as to be kept at a level within a predetermined range.

Namely, the above objects of the present invention are accomplished by the following processes described in the following items (1) to (11):

(1) A process for a fluidized-bed type activated-sludge treatment of sewage of industrial waste water comprising the step of adding a fine powder of granulated blast furnace slag to an aeration tank of an activated-sludge plant, said fine powder of granulated blast furnace slag serving as a fixing carrier for fixing the activated sludge.

(2) The process for the fluidized-bed type activated-sludge treatment of the sewage or industrial waste water as set forth in item (1), wherein an amount of air introduced in said aeration tank to which said fine powder of the granulated blast furnace slag has been added is controlled to maintain the oxidated-reduction potential of the contents or said aeration tank at a level within a predetermined target range.

(3) The process for a fluidized-bed type activated-sludge-treatment of sewage or industrial waste water as set forth in item (1) or (2), wherein said fine powder of granulated blast furnace slag having a particle size of from 0.02 to 0.5 mm is added to said aeration tank by an amount of from 1 to 5% by weight per unit of said aeration tank volume.

(4) The process for the fluidized-bed type activated-sludge treatment of the sewage or industrial waste water as set forth in item (1) or (2) werein said fine powder of granulated blast furnace slag having a particle size of from 0.02 to 0.5 mm is added to said aeration tank by an amount of from 10 to 50 Kg per 1 $m^3$ of said aeration tank volume.

(5) A process for the fixed-bed type activated-sludge treatment of sewage or industrial waste water comprising the step of mounting a ceramic article mainly constructed of granulated blast furnace slag in an aeration tank of an activated-sludge treatment plant, said ceramic article serving as a fixing carrier for the activated sludge.

(6) The process for the fixed-bed type activated-sludge treatment of sewage or industrial waste water as set forth in item (5), wherein said ceramic article mainly contructed of granulated blast furnace slag has a plate-like cassette form constructed of porous ceramic material.

(7) The process for the fixed-bed type activated-sludge treatment of sewage or industrial waste water as set forth in item 5, wherein said ceramic article mainly constructed of granulated blast furnace slag is a cassette filled with chip-like ceramic material.

(8) The process for the fixed-bed type activated-sludge treatment of sewage or industrial waste water as set forth in item 5, wherein said ceramic article mainly constructed of granulated blast furnace slag is a cassette filled with a saddle-shaped ceramic material.

(9) The process for the fixed-bed type activated-sludge treatment of sewage or industrial waste water as set forth in any one of items (5) to (8), wherein under such in a conditions that the activated sludge is adhered to said ceramic material mainly constructed of the granulated blast furnace slag, sewage or industrial waste water in which oxygen is previously dissolved through aeration passes through said ceramic material so as to be treated.

(10) The process for the fixed-bed type activated-sludge treatment of sewage or industrial waste water as set forth in item (9), wherein under conditions in which the activated sludge is adhered to said ceramic material mainly constructed of the granulated blast furnace slag, the sewage or industrial waste water in which oxygen is previously dissolved through the aeration passes through said ceramic material an as to be treated, while the amount of air employed in said aeration is controlled to maintain the oxidation-reduction potential of the effluent, which has been subjected to such a biochemical treatment, at a level within a predetermined target range.

(11) A process for the fixed-bed type activated-sludge treatment of sewage or industrial waste water comprising the steps of:

arranging a plurality of cassettes across a stream of the sewage or industrial waste water, said cassettes serving as fixing carriers for the activated sludge, said cassettes being plate-like porous ceramic articles mainly constructed of the granulated blast furnace slag or said cassettes being filled with ceramic materials mainly comprising the granulated blast furnace slag, whereby a biochemical treatment of the sewage or industrial waste water is conducted for a predetermined period of time;

removing, among said cassettes, one cassette located in the first position nearest an inlet side of the sewage or industrial waste water, while the remaining cassettes are sequentially moved toward said inlet side of the sewage or industrial waste water in a parallel manner;

mounting a new cassette or a renovated cassette in the last position of said cassettes thus cleared by the above sequential movement of said remaining cassettes;

removing deposits of said one cassette therefrom to renovate said one cassette, to make it possible that said one cassette is mounted in said last position of said cassettes;

whereby said biochemical treatment of the sewage or industrial waste water is continuously conducted while said plurality of cassettes are sequentially replaced with said renovated cassette or a new cassette.

DESCRIPTION OF THE PREFERRED EMBODIMENTS

Hereinbelow will be described in detail the present invention.

The granulated blast furnace slag is produced by suddenly chilling the slag originated in the blast furnace of ironworks by an amount of from 300 to 500 Kg per 1 ton of pig iron by the use of high-pressure water. The vitrification rate or vilrescence rate of the granulated blast furnace slag is at least about 90%, while the granulated blast furnace slag is porous. As shown in Table 1, in composition, the granulated furnace slag contains CaO, $SiO_2$, $Al_2O_3$ as its principal components, and further contains FeO, MgO and the like. The good adherability of the granulated blast furnace slag to the activated sludge results from the fact that the granulated blast furnace slag is porous and also due to its composition.

TABLE 1

| Composition Example of the granulated blast furnace slag | | | | | (%) |
|---|---|---|---|---|---|
| $SiO_2$ | $Al_2O_3$ | FeO | CaO | MgO | balance |
| 33.8 | 15.3 | 0.4 | 41.9 | 3.1 | 3.1 |

Hereinbelow will be described the activated sludge's adhering mechanism to the granulated blast furnace slag.

In general, the activated-sludge treatment has a tendency to lower the pH level of the aeration tank since the compounds of nitrous acid and the compounds of nitric acid are produced through nitration of the compounds of ammonia or fatty acid as produced through the decomposition of the organic pollutants. When the pH level of the aeration tank falls in a range not suitable for the subsistence of the activated sludge, there result bulking of the activated sludge, poor decomposition of the pollutants and the like. As a result, the activated-sludge treatment of sewage is apt to be poor. On the other hand, when the granulated blast furnace slag is added to the aeration tank of the activated-sludge treatment, the CaO of the granulated blast furnace slag dissolves in case that the pH level of the aeration tank lowers so as to prevent such pH level from lowering, so that the pH level of the aeration tank is kept in the optimum range for subsistence of the activated sludge, whereby remarkable effects are obtained in stabilizing the activated-sludge treatment in its operation and in improving the quality of the activated sludge effluent. At this time, CaO of the granulated blast furnace slag dissolves not suddenly, but gradually. This results from the fact that the granulated blast furnace slag has a vitrification rate of at least about 90%, which prevents CaO from suddenly dissolving so as to prevent the pH level of the aeration tank from being suddenly increased. The thus dissolved CaO reacts with the compound of nitric acid, the compounds of nitrous acid and the fatty acid. In addition, such CaO also reacts with carbon dioxide gas produced through breath of the activated sludge to produce calcium carbonate. The thus produced calcium carbonate is in the form of fine particles to which the activated sludge readily adheres. The granulated blast furnace slag in which the CaO has dissolved becomes more porous and as a result, it assumes a shape and a porosity to which the activated sludge readily adheres. Further, the activated sludge requires, as its nutrients, phosphorus and nitrogen together with metals such as trace amounts of iron, magnesium and the like. Since the granulated blast furnace slag contains FeO and MgO respectively, the activated sludge has a tendency to readily adhere to the granulated blast furnace slag in order to ingest its nutrients such as iron, magnesium and the like from the granulated blast furnace sludge.

As described above, it is clear that the granulated blast furnace slag has a porous construction and a composition both of which facilitates adhesion of the activated sludge to the slag, and also has the effect that the activated-sludge treatment of sewage is prevented from deteriorating by bulking resulting in poor decomposition or destruction of the pollutants in the sewage. As a result, it has been found that although the granulated blast furnace slag forms an inorganic fixing carrier, has more excellent properties than other inorganic fixing carriers made of diatomaceous earth, sand and the like.

Incidentally, Japanese Laid-Open Patent Publication No. 57-75189 discloses that, in a process for a trickling-filter type waste-water treatment, an air-cooled blast furnace slag filler may be employed as a carrier for the activated sludge.

However, when such an air-cooled blast furnace slag is employed as a fixing carrier for the activated sludge contained in the fluidized-bed reactor, there occurs many problems. This can be seen, for example, by examining the granulated blast furnace slag and the air-cooled blast furnace slag as shown in the following Table 2 and comparing the properties.

TABLE 2

Properties of the granulated blast furnace slag and the air-cooled blast furnace slag

| Properties | Granulated blast furnace slag | Air-cooled blast furnace slag |
| --- | --- | --- |
| Porosity | 25 to 50% | 10 to 30% |
| Apparent specific gravity | 2.0 to 2.7 | 2.5 to 3.5 |
| Structure | glass | crystal |

From the above Table 2, it is clear that the air-cooled blast furnace slag is not adequate as a fixing carrier for the activated sludge in contrast with the granulated blast furnace slag. Namely, since the air-cooled blast furnace slag is considerably lower in porosity than the granulated blast furnace slag and the porosity considerably affects the activated-sludge fixing performance, the air-cooled blast furnace is poor in adherability as to the artivated sludge. Further since the air-cooled blast furnace slag is considerably larger in apparent specific gravity than the granulated blast furnace, the air-cooled blast furnace slag is poor in flowability in the reactor, so that the air-cooled blast furnace slag is readily deposited in the reactor to considerably lower its fixing performance as to the activated sludge.

In addition, since the air-cooled blast furnace slag has a crystalline structure, it is harder than the granulated blast furnace slag which has a glass structure, so that the air-cooled blast furnace slag requires a large amount of energy to crush it. Further, when added to the reactor, the air-cooled blast furnace slag causes a large amount of CaO to dissolve in the contents of the reactor so as to suddenly alkalify the contents of the reactor due to the crystalline structure of the air-cooled blast furnace slag, which deteriorates the treatment performance of the activated sludge.

As described above, the air-cooled blast furnace slag has many defects so that it is not adequate as a fixing carrier for the activated sludge employed in the fluidized-bed type reactor.

In addition, the inventors of the present invention have also found out that when a porous ceramic material is immersed in an activated-sludge mixed liquid taken from the aeration tank of the sewage-treatment, the activated sludge itself enters the interior of such porous ceramic material to make the activated-sludge mixed liquid clear. Further it has been discovered by the inventors of the present invention that when a pipe-shaped cassette, filled with ceramic material showing a chip-like shape comprising a saddle-backed shape, a ring-like shape, a spherical shape and like shapes, is immersed in the activated-sludge mixed liquid, the activated sludge enters the voids defined by the chip-like ceramic material of such pipe-shaped cassette; this makes the activated-sludge mixed liquid clear as is in the case of the porous ceramic material.

Based on the above fact, the inventors of the present invention have found out that a cassette filled with the porous ceramic material or the chip-like ceramic material can be employed as the fixing carrier for the activated sludge, and studied as to whether such ceramic cassette is applicable to the activated-sludge treatment of the sewage.

In this connection, hitherto, any of the conventional porous ceramic material and the chip-like ceramic material has been mainly constructed of expensive materials, such as alumina and silica, which require in firing a very-high temperature of from 1400 to 1600° C. with a long-firing time, so that the conventional materials cause the cost of manufacturing to increase, which makes it impossible to employ such expensive conventional materials in the treatment of the sewage or industrial waste water.

In a process for developing low-price ceramic materials, the inventors of the present invention studied granulated blast furnace slag as to whether it could be employed as a main constituent element of such low-price ceramic material. Namely, since the granulated blast furnace slag is a by-product produced in the ironworks, the granulated blast furnace slag is extremely lower in price than a conventional ceramic materials such as alumina, silica and the like. In addition, since the granulated blast furnace slag contains CaO by an amount of from 42 to 45%, it was presumed that the firing temperature of the granulated blast furnace slag was fairly lower than those of alumina materials and silica materials.

On the basis of the above facts, it was found that if a ceramic material merely constructed of the granulated blast furnace slag is fired at a temperature, for example, within the range of from 900° to 950° C., and at a suitable firing time, for example, within a range of from 1 to 2 hours, a ceramic material of a porous structure and a chip-like shape with various configurations can be produced.

As a result, it was found that the cost of manufacturing the ceramic material mainly constructed of the granulated blast furnace slag was reduced to within a range of from 1/5 to 1/20 of that of a conventional ceramic material mainly constructed of alumina, cilica and the like. Accordingly, it was found that there is no problem in the cost of manufacturing even when the ceramic material mainly constructed of the granulated blast furnace slag was employed in the treatment of sewage or industrial waste water.

Further, the ceramic material mainly constructed of granulated blast furnace slag retains the excellent properties of the granulated blast furnace slag for fixing the activated sludge thereto, which makes this ceramic material superior to the conventional ceramic material mainly constructed of alumina materials, silica materials and the like with respect to the properties for fixing the activated sludge to the ceramic material.

Next, there will be described the case in which ceramic materials mainly constructed of granulated blast furnace slag and a fine powder thereof serve as fixing carriers for the activated sludge employed in the treatment of the sewage or industrial waste water.

First, there will be described a case in which the fine powder of the granulated blast furnace slag is added to the aeration tank of the fluidized-bed type activated sludge treatment plant so as to serve as the fixing carriers for the activated sludge.

When the granulated blast furnace slag is employed to serve as the fixing carrier of the activated sludge, it suffices to feed the aeration tank the granulated blast furnace slag having been ground into a particle size under 0.5 mm by an amount of from 10 to 50 Kg per 1 m$^3$ of the aeration tank volume. The relationship between the particle size of the granulated blast furnace slag and the adherability of the activated sludge is as follows: namely, the finer the granulated blst furnace slag is ground, the easier the activated sludge adheres to the thus ground granulated blast furnace slag. However, the finer the granulated blast furnace slag becomes, the easier the thus ground granulated blast furnace slag flows out of the sludge thickener together with the effluent. As a result, it is preferable to employ a particle size of at least 0.02 mm as to the thus ground granulated blast furnace slag. In addition, in the relationship between the particle size of the granulated blast furnace slag and the dispersability of such slag in the aeration tank, in the case where the particle size of the granulated blast furnace slag is more than 0.5 mm, the dispersability of such slag is impaired to make it difficult to uniformly disperse the slag in the aeration tank. Consequently, taking into consideration the above, the optimum particle size of the granulated blast furnace slag to be added to the aeration tank is within a range of from 0.02 to 0.5 mm.

Now, the applicable amount of the fine powder of the granulated blast furnace slag to be added to the aeration tank will be described. Such amount of slag is determined by observing the state or condition of adhesion of the activated sludge to the granulated blast furnace slag by examining with a microscope and on the basis of the settleability of the activated sludge. Namely, in the case where the amount of granulated blast furnace slag is within a range of less than 10 Kg per 1 m$^3$ of the aeration tank volume, there exists activated sludge still not adhered to the granulated blast furnace slag in the aeration tank, and there is a tendency to readily produce bulking of the activated sludge in a high-load condition of the treatment of BOD, or under conditions where the amount of BOD load varies. On the other hand, in the case that the applicable amount of granulated blast furnace slag to be added to the aeration tank exceeds a value of 10 Kg per 1 m$^3$ of the aeration tank volume, the above-mentioned problems are resolved which makes it possible to obtain a good performance of the treatment. However, when such amount of the granulated blast furnace slag to be added to the aeration tank exceeds the value of 50 Kg, it is recognized that the performance of the treatment is not further improved. Consequently, the optimum amount of the granulated blast furnace slag to be added to the aeration tank is within a range of from 10 to 50 Kg per 1 m$^3$ of the aeration tank volume. Incidentally, completion of the adhesion of the activated sludge to the granulated blast furnace slag requires substantially one month after addition of the granulated blast furnace slag to the aeration tank.

Incidentally, in the ironworks, in addition to the blast furnace slag or so-called pig-iron slag, there is steel slag such as converter slag origination in the steel-making process for producing a steel having necessary components adequate to an intended use.

The composition of the converter slag is s hown in TABLE 3. Such converter slag contains CaO by an amount of from 35 to 48% as is in the case of the granulated blast furnace slag employed in the present invention. In addition, the converter slag also contains iron and magnesium which constitute nutrients for the activated sludge.

TABLE 3

| Composition Example of Converter slag | | | | | |
| --- | --- | --- | --- | --- | --- |
| | | | | | (by weight %) |
| T.Fe | CaO | SiO$_2$ | MnO | MgO | P$_2$O$_5$ |
| 14 to 30 | 35 to 48 | 7 to 18 | 3 to 6 | 3 to 6 | 1 to 3.5 |

Although such converter slag representing the steel slag is expected to provide the same effect as that of the granulated blast furnace slag, it is, in fact, impossible for the converter slag to serve as a fixing carrier of the activated sludge in contrast with the granulated blast furnace slag.

The reason why the converter slag can not serve as the fixing carrier for the activated sludge is as follows: namelyl, since the converter slag is not vitrified in contrast with the granulated blast furnace slag, dissolution of CaO occurs suddenly. Consequently, in case that a converter slag is employed as the fixing carrier of the activated sludge, the pH level of the aeration tank to which the converter slag has been added increases suddenly, and exceeds drastically a pH range (7.0±0.5) adequate for subsistence of the activated sludge to cause it to die.

Another problem of the converter slag is that, since the converter slag contains a large amount of iron making its specific gravity large, the converter slag requires a large amount of air in the aeration of the aeration tank to float the converter slag therein, which causes destruction of the activated sludge, thereby increasing the operation cost and causing many other problems.

As described above, since the converter slag representing the steel slag has such critical defects, it is difficult to employ the converter slag as a fixing carrier for the activated sludge.

Now, there will be described a case in which a ceramic material, composed mainly constructed of the granulated blast furnace slag, is employed as a fixing carrier for the activated sludge in an activated-sludge treatment of sewage.

According to the present invention, it was found that an industrially preferable form of the ceramic material to be employed as the fixing carrier for the activated sludge is a cassette, i.e., a plate-like porous ceramic article or a cassette filled with a ceramic filler having a chip-like form, a saddle-like form and/or the like.

Figure 1:
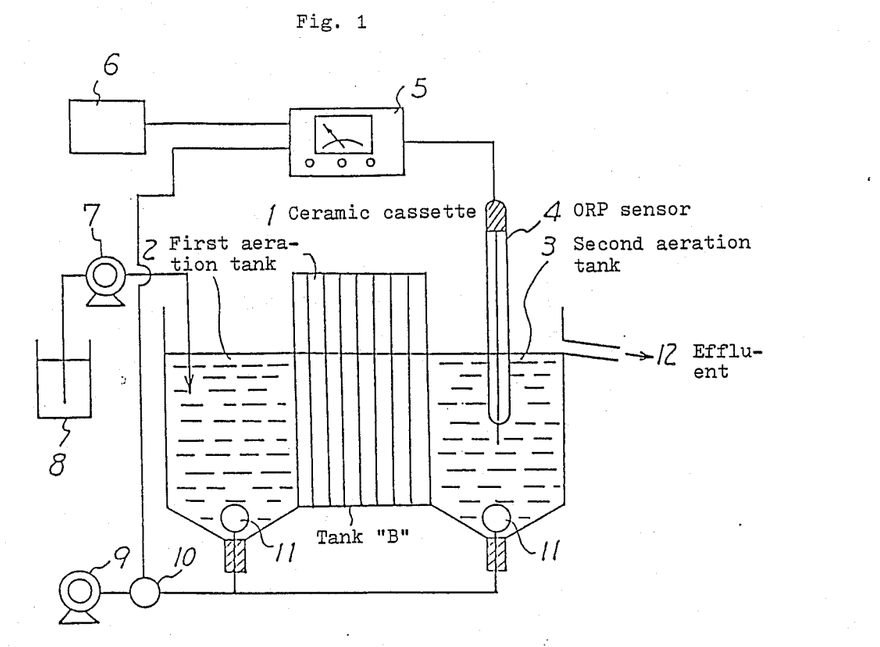
FIG. 1 is a schematic view of laboratory equipment for biochemically treating sewage or industrial waste water, in which equipment, a set of ceramic cassettes are mounted according to the present invention.

As shown in FIG. 1, the cassette constructed of the above ceramic material is mounted in a biochemical-reaction tank of the sewage- or the industrial waste water-treatment equipment for treating the sewage and the industrial waste water, treatment conditions of which will be described together with the construction of the equipment hereinbelow.

Shown in FIG. 1 is the biochemical-treatment equipment of the sewage and the industrial waste water, in which equipment are provided: a first aeration tank 2; a second aeration tank 3; and a tank "B" interposed between the first 2 and the second 3 aeration tanks, in which tank "B" are provided a set of the ceramic cassette 1, each of which is constructed of a plate-like porous ceramic article consisting mainly of the granulated blast furnace slag or is filled with a ceramic filler having, for example, a chip-like form. On the bottoms of the first and the second aeration tanks (2, 3) are provided aeration-diffusion pipes 11 and connected with an aeration blower 9 through the connection pipes.

An oxidation-reduction potential (hereinafter preferred to as ORP) sensor 4 is provided in the second aeration tank 3 at its discharge side of the biochemical-treatment equipment effluent 12. This ORP sensor 4 is connected to an ORP-control unit 5, which is connected to an aeration-control solenoid valve 10 through a lead wire. This solenoid valve 10 is interposed between the aeration-diffusion pipes 11 and the aeration blower 9, while actuated through an instruction signal issued from the ORP-control unit 5 to control the amount of aeration air. In FIG. 1: the reference numeral 6 denotes a recorder; 7 a sewage-feed pump; and 8 a sewage-control tank.

Now, the sewage treatment conducted in the biochemical-reaction tank shown in FIG. 1 will be described.

First, as a seed sludge, a sewage's activated-sludge-mixed liquid having an activated-sludge concentration of from 1000 to 5000 mg/l is poured into the first and the second aeration tanks (2, 3) shown in FIG. 1 and the first and the second aeration tanks are aerated by air, so that the activated sludge enters pores or voids of the ceramic materail of the cassettes 1 to cause both the contents of the first and the second aeration tanks (2, 3) to become substantially clear 5 to 20 hours later. Then, air or oxygen-rich air or oxygen is blow into the first and the second aeration tanks (2, 3) from the aeration-diffusion pipes 11.

After that, the sewage is so poured into the first aeration tank 2 that the sewage passes through the first aeration tank 2, the tank "B" and the second aeration tank 3 by taking an apparent-time consumption of 16 hours corresponding to a treatment time of the sewage. Then, the treatment time of the sewage is gradually reduced so that the activated sludge is cultivated. Normally, the treatment, in which the sewage is allowed to pass through the tanks, is conducted for a period of 2 to 6 hours, and the cultivation of the activated sludge needs to be carried out for about 10 to 30 days.

Incidentally, in the fixed-bed type biochemical-reaction tank employing the ceramic material consisting mainly of the granulated blast furnace slag as the fixing carrier for the activated sludge, decomposition of pollutants contained in the sewage is conducted as follows: First, as shown in FIG. 1, air loaded with oxygen for aeration use is blown into the sewage poured into the first aeration tank 2 to dissolve oxygen in the sewage, which is then passed through the ceramic cassettes 1 provided in the tank "B" so that the pollutants contained in the sewage are decomposed by the activated sludge adhered to the ceramic cassettes 1 with the consumption of the thus dissolved oxygen. In the second aeration tank 3, oxygen is further dissolved in the effluent to cause the remaining pollutants contained in the sewage to be decomposed or to cause causative agents of malodor of the effluent to be eliminated, while the effluent is made aerobic. As a result, as described later, the process of the present invention obtains remarkable effects superior to those obtained by the conventional process.

The ceramic material employed in the process of the present invention comprises an amount of from more than 50 to 90 wt %, preferably, from 70 to 85 wt % of the granulated blast furnace slag, and the conventional inorganic ceramic materials such as alumina, silica and the other inorganic materials. In the case where the ceramic material employed in the process of the present invention is formed into a plate-like porous ceramic article, the ceramic material further comprises a pore-forming agent, for example such as sawdust, rice hull, urethane powder and the like. In preparing the ceramic material used in the process of the present invention, the above-mentioned starting materials are first blended and then kneaded with water to prepare a paste which is formed into a predetermined shape and then subjected to a firing treatment to produce a final product.

Although the pore size of the ceramic materials employed in the process of the present invention is not limited, the optimum diameter of the pores of the ceramic material employed in the process of the present invention is within a range of from 1 to 5 mm, while the pores may vary in size within the above range.

Construction of the pores of the ceramic material employed in the process of the present invention considerably affect both the adherability of the activated sludge and clogginess in the sewage-treatment process. For example, in the case where the pores of the ceramic material form a so-called two-dimensional pore construction such as a pore construction of a honeycomb article in which inlet openings of the pores are straightly communicated with outlet openings of the same pores via one passage respectively, such a two-dimensional pore construction is readily clogged in the sewage treatment. In this connection, it is empirically known where in case that the pores of the ceramic material form a so-called three-dimensional pore construction in which the pores or the ceramic material are branched off to communicate with each other, it is hard to clog such three-dimensional pore construction in the sewage treatment.

On the other hand, in the cassette 1 filled with the ceramic filler, though the ceramic filler is not limited in its shape and size. However, it is preferable that the ceramic filler have a simple shape, for example such as a plate-like shape, a cylindrical shape, a semicircular shape, saddle-like shape, a granular shape or the like. As for the size of the ceramic filler, the optimum diameter of the ceramic filler is substantially within a range of from 10 to 100 mm. When the outer diameter of the ceramic filler is less than 10 mm, the cassette 1 filled with such ceramic filler is readily clogged in the sewage treatment. On the other hand, when the outer diameter of the ceramic filler is more than 100 mm, the activated sludge adhered to such ceramic filler readily flows away from the cassette 1 filled with such ceramic filler. In filling the cassette 1 with the ceramic filler, the cassette 1 may be constructed of a metallic network by making a container of the network and charging the ceramic filler in it.

Now there will be described an aeration conducted in the biochemical-reaction tank or aeration tank, according to the present invention.

According to the study regarding the sewage and of the inventors of the industrial waste water of the inventors of the present invention, it is clear that it is possible to maintain the level of the biochemical-oxgen demand (BOD) of the effluent under 20 mg/l when the oxidation-reduction potential (ORP) at a position of an outlet of the aeration tank is kept at a level within a predetermined range.

For example, in the sewage-treatment fluidized-bed type aeration tank employing the fine powder of the granulated blast furnace slag, the aeration conditions affect the performance of the activated-sludge treatment such as decomposability of the pollutants of the sewage, nitration-reaction of such pollutants, and the properties of the activated sludge together with the dispersibility of the granulated blast furnace slag. Consequently, there is needed an aeration construction for satisfying both the dispersability of the granulated blast furnace slag and the performance or the activated-sludge treatment of the sewage.

The performance of the activated-sludge treatment closely relates to the oxidation-reduction potential (ORP) of the aeration tank, so that it is possible to conduct the decomposition of the pollutants in a good condition by controlling the amount of aeraton air by the use of the ORP level which serves as a parameter of the decomposition and contributes to the prevention of the nitration-reaction and the bulking of the activated sludge. In the activated-sludge treatment plant of sewage, a preferable level of ORP is within a range of from 0 to +100 mV as measured by the use of an Au/Ag-AgCl electrode.

In the activated-sludge treatment of sewage, the ORP level of the aeration tank correlates considerably to the amount of aeration air. In a normal treatment, it suffices to control the amount of aeration air in accordance with the ORP-level. However, in the present invention, if a certain amount of aeraton air corresponds to a condition producing +50 mV or less of ORP in the aeration tank, such amount of aeration air can not uniformly disperse the granulated blast furnace slag having a particle size of from 0.02 to 0.5 mm in the aeration tank. Consequently, it is necessary for the ORP level of the present invention to clear its setting target of at least +50 mV and to keep the ORP level by providing a necessary amount of aeration air.

On the other hand, as for an upper limit of the ORP level, it is possible to realize a level of up to about +150 mV owing to the adherability of the activated sludge to the granulated blast furnace slag. Namely, in the conventional treatment in which the granulated blast furnace slag is not added to the aeration tank, when the ORP level exceeds a value of +100 mV, the nitration-reaction is remarkably facilitated to cause the pH level of the aeration tank to lower and also to cause the sludge to float and flow out through denitrification reaction conducted in the sludge thickener, whereby the quality of the effluent is deteriorated. In contrast, in the case where the granulated blast furnace slag is added to the aeration tank, when the ORP level exceeds a value of +100 mV, the nitration-reaction occurs as is in the conventional treatment, while any of the decrease of the pH level of the aeration tank and the floatation and flowage of the sludge and the like is prevented from occurring, thereby making it possible to maintain a high quality effluent. Consequently, there is no problem in the performance of the treatment. However, when the ORP level exceeds a value of +150 mV, the activated sludge is finely divided by the aeration air to cause the thus divided sludge not to readily adhere to the granulated blast furnace slag. From the above fact, taking into consideration the dispersibility of the granulated blst furnace slag and the adherability of the activated sludge to the slag, it is best to keep the ORP level of the aeration tank within a range of from +50 to +150 mV.

As for the aeration of the fixed-bed type biochemical-treatment tank employing the porous or chip-like ceramic material consisting mainly of the granulated blast furnace slag as the fixing carrier for the activated sludge, since there is a close relationship between the ORP level of the aeration tank and its disposal performance in the uniformly-mixed type activated-sludge treatment as described in the foregoing, the ORP sensor 4 is mounted in the second areration tank 3 as shown in FIG. 1. Under such circumstances, aeration is so conducted in both the first and the second aeration tanks (2, 3) that the ORP level of the second aeration tank 3 is kept at a level within a predetermined range, for example, a range of from 0 to +150 mV in the sewage treatment.

Incidentally, in the fixed-bed type activated-sludge treatment employing the porous or chip-like ceramic material, constructed of the granulated blast furnace slag, as the fixing carrier for the activated sludge, the activated sludge is substantially completely held in the ceramic cassettes 1 to substantially prevent the activated sludge from flowing to the second aeration tank 3, so that the sludge thickener employed in the conventional activated-sludge treatment may be eliminated or simplified in the process of the present invention.

In the case where the biochemical-treatment of the sewage is carried out by the use of the activated sludge adhered to the ceramic cassettes 1 for a long period of time, the pollutants of the suspended solids or activated sludge which have proliferated, often clog the ceramic cassettes 1.

In the equipment shown in FIG. 1, the first cassette 1 of the tank "B", which cassette 1 is nearest the first aeration tank 2, is most readily clogged. When such clogging occurs or the first cassette 1 is substantially clogged, the first cassette 1 is taken away from the first position of the tank "B" so that the remaining cassettes 1 of the tank "B" are sequentially moved toward the first aeration tank 2 in a parallel manner in that the second cassette 1 is moved to the thus cleared first position in which the first cassette 1 was mounted, and then the third cassette 1 is moved to the second position of the tank "B" in which second position the second cassette 1 was mounted, and so on. As a result, the last position of the tank "B" is cleared, so that a new cassette 1 or a renovated cassette 1 is mounted in the thus cleared last position of the tank "B". The set of the cassettes 1 mounted in the tank "B" are changed in a circulating manner as described above during the sewage treatment, to prevent deterioration in both the treatment efficiency and the quality of the effluent. Consequently, this is the optimum process for treating the sewage.

In addition to the treatment of the sewage, the activated-sludge treatment technique of the present invention is also applicable to the treatment of industrial waste water, for example such as ammonia liquors discharged from the coke ovens of the ironworks, waste water discharged from coal-gasification or liquefaction plant waste water produced in the petroleum-refining process, waste water discharged from food precessing plants, waste water discharged from fermentation plants of alcohol and the like.

Also in these treatments of the industrial waste water, the treatment efficiency thereof and the quality of the effluent are improved as is in the treatment of the sewage.

Next, there will be described Examples of the present invention.

EXAMPLE 1

In an aeration tank (capacity: 20 l) of an ORP-controlling activated-sludge treatment apparatus in which the ORP level of the aeration tank was controlled to keep it at a level of +100 mV, there was added 600 g of the granulated blast furnace slag having a particle size of from 0.02 to 0.2 mm (which 600 g corresponds to 30 Kg per 1 m³ of the aeration tank volume of 3 wt %/volume), so that a high-concentration artificial sewage having a composition and properties shown in Table 4 was treated in the aeration tank. In this connection, there is shown the relationship between the treatment time and the quality of the effluent in Table 5; the change of the properties of the activated sludge with time after addition of the granulated blast furnace slag in Table 6; and settlement behavior of the activated sludge after 30 days from the addition of the granulated blast furnace slag in FIG. 2; respectively.

TABLE 4

The Artificial Sewage Composition and its Properties

| Ingredient | Concentration | BOD$_5$ | | COD$_{Mn}$ | | (g/m³) |
|---|---|---|---|---|---|---|
| Peptone | 150 | Average | σ | Average | σ | |
| Meat extract | 150 | 378 | 69.3 | 173 | 49.8 | |
| Yeast extract | 171 | | | | | |
| Dextrin | 71 | TOC | | TS | | |
| KH$_2$PO$_4$ | 44 | 164 | 42.5 | 729 | 88.6 | |
| KCl | 30 | | | | | |
| MgSO$_4$ | 15 | | | | | |
| NaCl | 9 | | | | | |

(Note)
TOC: Total organic carbon;
TS: Total solid content;
COD$_{Mn}$: Chemical oxygen demand; and
σ: Standard deviation value

TABLE 5

Relationship between Treatment Conditions and the Quality of the Final Thickener Effluent

| Treatment time (hour) | 6 | 4.8 | 2.4 |
|---|---|---|---|
| Amount of granulated slag to be added (%) | 0 | 2 | 2 |
| BOD volume loading (kg/m³ · day) | 1.13 | 1.42 | 2.83 |
| Effluent (mg/l) | | | |
| BOD$_5$ | 36.6 | <5.0 | <5.0 |
| COD$_{Mn}$ | 81.5 | 26.6 | 13.8 |
| TOC | 24.6 | 11.6 | 8.9 |
| SS | 38.2 | 37.8 | 10.5 |

(Note)
TOC: Total organic carbon
SS: Suspended solids

TABLE 6

Effects of the granulated blast furnace slag on the properties of the activated sludge

| | MLSS (mg/l) | SV30 (%) | SVI | MLVSS (mg/l) | Volatile (%) |
|---|---|---|---|---|---|
| Prior to addition of granulated slag | 1208 | 12.1 | 100.1 | 987 | 81.7 |
| Addition of granulated slag | | | | | |
| Immediately after addition | 18872 | 42.3 | 22.4 | 907 | 4.8 |
| 10 days later | 13448 | 29.0 | 21.6 | 2240 | 16.7 |
| 20 days later | 17700 | 29.0 | 16.4 | 3214 | 18.1 |

TABLE 6-continued

Effects of the granulated blast furnace slag on the properties of the activated sludge

| | MLSS (mg/l) | SV30 (%) | SVI | MLVSS (mg/l) | Volatile (%) |
|---|---|---|---|---|---|
| 30 days later | 20594 | 55.8 | 27.1 | 3021 | 15.0 |

(Note)
MLSS: Mixed liquor suspended solids
SV30: Volume of the sludge after 30 minutes settling.
SVI: Sludge volume index (SVI = SV30 (%)/MLSS (%))
MLVSS: Mixed liquor volatile suspended solids (volatile content of the sludge at the time when MLSS was dried and heated at 600° C.)

From the Table 5, it is clear that a 2.4 to 4.8 hours of the activated-sludge treatment with the addition of the blast-furnace slag causes the effluent to show a BOD$_5$ under 5 mg/l (removal rate of at least 90%), a COD$_{Mn}$ of from 14 to 27 mg/l (removal rate of from 93 to 95%); and a SS of from 11 to 38 mg/l, whereby it is possible to conduct a high-efficiency treatment of sewage by the use of the granulated blast furnace slag serving as the fixing carrier of the activated sludge, and, therefore, it is possible to obtain a higher-quality effluent.

Figure 2:
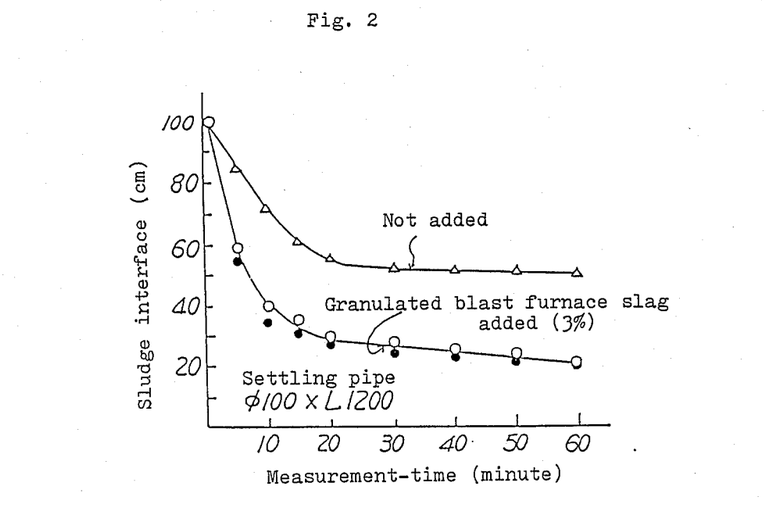
FIG. 2 is a diagram illustrating settling curves, one of which shows the condition of the activated sludge 30 days after the addition of the granulated blast furnace slag.

In addition, the settleability of the activated sludge was shown in a settlement curve of the activated sludge in FIG. 2, which curve was obtained after 30 days from the addition of the granulated blast furnace slag. From FIG. 2, it is clarified that the settling velocity of from 3 to 4 m/hour is obtained in a free-settlement range in the case wherein the granulated blast furnace slag is added to the aeration tank at a rate of 3 wt %/volume (as shown in marks of -O- or -●- ), while a settling velocity of from 1.5 to 2.0 m/hour is obtained in the case wherein the granulated blast furnace slag is not added to the aeration tank (as shown in a mark of: -Δ-). As described above, the granulated blast furnace slag has the effect of increasing the settling velocity of the activated sludge.

The Table 6 shows the properties of the activated sludge in their variation with time after addition of the granulated blast furnace slag. As shown in the Table 6, a level of MLVSS (volatile content of the sludge) was 907 mg/l immediately after addition of the granulated blast furnace slag, which increased to a level of from 2,200 to 3,200 mg/l after 10 to 30 days from addition of the granulated blast furnace slag. However, a level of SVI which is a parameter of the settleability of the activated sludge was in a range of from 16 to 27. Consequently, the settleability of the activated sludge is not lowered even when the MLVSS increases.

As described above, it is clarified that in any of the treatment efficiency, the quality of the effluent, the properties of the activated sludge and the like is remarkably improved in the activated-sludge treatment of the sewage when the granulated blast furnace slag is added to the aeration tank of the activated-sludge treatment apparatus in the operation thereof.

EXAMPLE 2

The treatment is conducted under the same conditions as those of the Example 1 with respect to a giant metropolis's actual sewage (separate sewage system) the properties of which are shown in the following Table 7. The following Table 8 shows the relationship between treatment time and the quality of the effluent.

TABLE 7

Properties of the municipal sewage employed in the experiment

| $BOD_5$ | $COD_{Mn}$ | TOC |
|---|---|---|
| 19 to 67 mg/l | 31 to 82 mg/l | 10 to 66 mg/l |

TABLE 8

Relationship between treatment time and the quality of the effluent (mg/l)

| | Treatment time | | | | |
|---|---|---|---|---|---|
| Item | 8 hours | 6 hours | 4 hours | 3 hours | 2 hours |
| $BOD_5$ | <5 mg/l | <5 mg/l | <5 mg/l | <5 mg/l | <5 mg/l |
| $COD_{Mn}$ | 9.8 to 24.2 | 13.0 to 16.7 | 11.8 to 13.6 | 10.3 to 11.5 | 9.8 to 10.6 |
| TOC | 9 to 14.3 | 7.0 to 9.3 | 5.3 to 9.3 | 4.8 to 7.6 | 5.5 to 6.5 |

As shown in the Table 8, although the treatment time is sequentially changed from a standard of 8 hours' to a 6 hours', a 4 hours', a 3 hours' and a 2 hours', the BOD does not exceed the level of 5 mg/l (removal rate; at least a level of from 64 to 94), while the COD is at a level of from 9.8 to 16.7 mg/l, and the TOC is at a level of from 5.3 to 14.3 mg/l.

From the above results, it is clarified that the fluidized-bed type activated-sludge treatment employing the granulated blast furnace slag as the fixing carrier of the activated sludge has a treatment efficiency of 3 to 4 times higher than the conventional activated-sludge treatment not employing the granulated blast furnace slag, and therefore it is possible to realize a considerable compactness for the treatment installations.

EXAMPLE 3

Thirty l of a sample of an activated-sludge mixed liquid obtained in the aeration tank of a municipal-sewage treatment plant was poured into the biochemical-reaction tank which is a laboratory equipment comprising a 10 l tank as a first aeration tank 2; a 20 l tank as tank "B"; and a 10 l of a second aeration tank 3, after that, a set of 5 pieces of cassettes 1, each of which is a plate-like porous ceramic article mainly consisting of 80 wt % of the granulated blast furnace slag and havign a pore size of from 1 to 3 mm, were mounted in the tank "B". About 3 hours later from such mounting, both the contents of the first and the second aeration tanks (2, 3) became clear. From this fact, it was recognized that the activated sludge was absorbed inside the porous ceramic articles or cassettes 1.

Under such circumstances, an artificial sewage was so poured into the first aeration tank 2 that the artificial sewage passed through the first aeration tank 2, the tank "B" and the second aeration tank 3 with an apparent- time consumption of 16 hours, 12 hours, 8 hours, 6 hours, 4 hours, 3 hours and 2 hours, respectively, to permit the activated sludge to adhere to the ceramic articles in the ceramic cassettes 1 so as to the adequately cultivated in the artificial sewage. After that, such treatment time was fixed to 2 hours and the treatment of such artificial sewage was conducted for an extended period of time. At this time, the ORP level was controlled so as to be maintained at a value of +100 mV by controlling the amount of aeration air to be blow into the first and the second aeration tanks (2, 3) was controlled. And, the concentration of the oxygen dissolved in both the contents of the first and the second aeration tanks (2, 3) was within a range of from 0.5 to 1.0 ppm in the first aeration tank 2 and within a range of from 2 to 5 ppm in the second aeration tank 3, respectively. The results of the treatment are shown in the following Table 10.

TABLE 9

The Artificial Sewage Composition and its Properties (mg/l)

| Ingredient | Concentration | $BOD_5$ | $COD_{Mn}$ |
|---|---|---|---|
| Peptone | 50 | 144–229 | 71.0–92.4 |
| Meat extract | 50 | Average: 200 | Average: 81.7 |
| Yeast extract | 70 | TOC | |
| Dextrin | 12 | 37.0–79.4 | |
| $KH_2PO_4$ | 44 | Average: 56.4 | |
| KCl | 30 | | |
| $MgSO_4$ | 15 | | |
| NaCl | 9 | | |

(Note)
TOC: Total organic carbon;
$COD_{Mn}$: Chemical oxygen demand.

TABLE 10

Relationship between Treatment Time and the Quality of the Effluent (mg/l)

| | | | | | | | |
|---|---|---|---|---|---|---|---|
| Treatment time (hour) | 16 | 12 | 8 | 6 | 4 | 3 | 2 |
| BOD volume loading ($Kg/m^3 \cdot day$) | 0.3 | 0.4 | 0.6 | 0.8 | 1.2 | 1.6 | 2.4 |
| Effluent $BOD_5$ | 4.5 | <5 | <5 | <5 | <5 | <5 | <5 |
| (mg/l) $COD_{Mn}$ | 10.3 | 10.5 | 9.7 | 9.5 | 8.8 | 8.5 | 8.7 |
| TOC | 3.6 | 4.5 | 4.6 | 4.3 | 4.7 | 3.5 | 4.8 |
| SS | 8.5 | 10.3 | 11.2 | 10.5 | 8.7 | 9.8 | 10.1 |

(Note)
TOC: Total organic carbon
SS: Suspended solids

From the Table 10, it is clear that in the biochemical-reaction tank in which are mounted 5 pieces of the plate-like porous ceramic articles (cassettes 1), even when an increased-load treatment with a BOD level of 2.4 $Kg/m^3 \cdot day$, i.e., a treatment with an amount of the BOD volume loading of about 4 to 5 times as high as that of the conventional activated-sludge treatment, it is possible to maintain the $BOD_5$ level of the effluent at a value of up to 5 mg/l (elimination rate of at least 98%), to maintain the $COD_{Mn}$ (average) level at a value of 8.7 mg/l (elimination ratio of from 68 to 89%), and to maintain the SS (average) level at a value of 10.1 mg/l, which makes it possible to carry out an excellent treatment of the sewage.

In addition, in the process of the present invention, the sludge thickener for separating the effluent from the activated sludge can be made simple. Further, it is clear that the activated-sludge treatment according to the process of the present invention has a treatment efficiency about 4 to 5 times higher than that of the conventional activated-sludge treatment of sewage.

EXAMPLE 4

In place of the plate-like porous ceramic articles employed in the Example 3, there is employed a set of 5 pieces of cassettes 1 each of which has the form of a plate-like porous ceramic article consisting mainly of a 75 wt % of the granulated-blast furnace slag having a pore size of from 2 to 5 mm in the treatment of the actual sewage. Samples of the actual sewage were obtained from the sewage-treatment plant of separate sewage systems in a metropolitan area, say, with a population of over 1,000,000 persons, and the samples were treated under the same conditions as those of the Example 1.

The properties of the municipal sewage employed in the above treatment are shown in the following Table 11, and the relationship between the treatment time and the quality of the effluent is shown in the another following Table 12.

TABLE 11

| Properties of the municipal sewage employed in the experiment | | | |
|---|---|---|---|
| $BOD_5$ | $COD_{Mn}$ | TOC | SS |
| 19 to 67 mg/l | 31 to 82 mg/l | 10 to 66 mg/l | 150 to 230 mg/l |

TABLE 12

| Relationship between Treatment Time and the Quality of the Effluent | | | | | | | |
|---|---|---|---|---|---|---|---|
| | | | | | | | (mg/l) |
| Treatment time (hour) | 16 | 12 | 8 | 6 | 4 | 3 | 2 |
| Effluent (mg/l) | | | | | | | |
| $BOD_5$ | <5 | <5 | <5 | <5 | <5 | <5 | <5 |
| $COD_{Mn}$ | 10.5 | 10.3 | 9.8 | 8.6 | 9.3 | 10.4 | 10.8 |
| TOC | 4.3 | 5.2 | 4.8 | 5.3 | 5.8 | 4.7 | 5.8 |
| SS | 11.2 | 10.8 | 8.5 | 9.8 | 10.5 | 10.3 | 11.4 |

(Note)
TOC: Total organic carbon
SS: Suspended solids

In the case wherein the actual sewage is richer in suspended solids (SS) content than the artificial sewage treated, there was an anxiety that it would cause clogging of the porous ceramic cassettes 1. In this Example 4, the sewage of an amount of 120 to 175 times (2.4 to 3.5 $m^3$) in volume as large as that (about 20 l) of the porous ceramic cassettes 1 was allowed to pass through the cassettes 1, so that the state near the clogging of the porous ceramic cassettes 1 was caused.

After such clogging occurred, the plate-like porous ceramic cassette mounted in the first position nearest the first aeration tank 2 was taken away from the tank "B" and cleaned with the use of a high-pressure water to renovate the clogged cassette 1. The thus renovated cassette was mounted again in the tank "B" at the last position nearest the second aeration tank 3 so that the treatment of the actual sewage was conducted. As a result, the effluent having the substantially same quality as that of the effluent shown in the Table 12 was obtained.

Consequently, it was clear that according to the process of the present invention using plate-like porous ceramics, it was possible to treat the actual sewage with a treatment efficiency or from about 4 to 5 times as high as that of the conventional activated-sludge treatment of the municipal sewage. In addition, the process of the present invention makes it possible to keep the SS level of the effluent at a value of up to 20 mg/l, so that the sludge thickener is not required i n the process of the present invention. Further, it was also clarified that the clogged porous ceramic cassette 1 was easily renovated by washing the high-pressure water.

EXAMPLE 5

In place of the porous ceramic cassettes 1 employed in the Example 3, cassettes filled with a ceramic filler were employed in the treatment of the actual sewage under the same conditions as those of the Example 3, which filler has the form of a semicircular ceramic material consisting mainly of a 80% by weight of the granulated blast furnace slag and having a diameter of about 20 mm. The results of this treatment are shown in the following Table 13.

TABLE 13

| Relationship between Treatment Time and the Quality of the Effluent | | | | | | | |
|---|---|---|---|---|---|---|---|
| | | | | | | | (mg/l) |
| Treatment time (hour) | 16 | 12 | 8 | 6 | 4 | 3 | 2 |
| BOD volume loading ($Kg/m^3 \cdot day$) | 0.3 | 0.4 | 0.6 | 0.8 | 1.2 | 1.6 | 2.4 |
| Effluent (mg/l) | | | | | | | |
| $BOD_5$ | 3.9 | 4.0 | 2.0 | 6.6 | 4.0 | 3.5 | 4.2 |
| $COD_{Mn}$ | 8.7 | 9.0 | 6.8 | 8.6 | 7.2 | 6.8 | 7.5 |
| TOC | 4.1 | 4.8 | 3.6 | 4.6 | 3.8 | 3.7 | 4.1 |
| SS | 16.5 | 16.0 | 12.7 | 11.9 | 8.0 | 9.3 | 9.5 |

(Note)
TOC: Total organic carbon
SS: Suspended solids

From the Table 13, it is clear that the cassettes 1 filled with the ceramic filler do not differ in treatment-performance from the plate-like porous ceramic cassettes 1 employed in the Example 3. Namely, the cassettes 1 filled with the ceramic filler also hold the activated sludge well, wo that they also may sufficiently eliminate the pollutants contained in the artificial sewage.

In addition, at this time, the treatment efficiency of the above treatment reached an amount of about 3 times as high as that of the conventional activated-sludge treatment of sewage, while the quality of the effluent is kept well.

EXAMPLE 6

In the treatment of ammonia liquors discharged from the coke ovens of ironworks, the fine powder of the granulated blast furnace slag having a particle size of from 0.02 to 0.2 mm (average particle size: 0.05 mm) was added to the aeration tank (fluidized-layer type reactor) of a uniformly-mixed type activated-sludge treatment installation by an amount of 50 Kg per 1 $m^3$ of the aeration tank volume. At this tie, the ORP level of the aeration tank was controlled to be kept at a value of from 200 to 250 mV as measured by use of Au/Ag-AgCl electrode, so that the ammonia liquors (dilution factor is 4 to 1) having the properties shown in the following Table 14 were treated.

Incidentally, the treatment conditions were as follows:
COD volume loading: 3.5 to 4.0 Kg/m³·day;
Treatment time: 4.4 to 6.7 hours; and
Returned sludge ratio: 100%.

The quality of the effluent obtained in the above treatment is shown in the following Table 14.

TABLE 14

| | Quality in the waste water supplied to the plant and in the effluent | | | | | |
|---|---|---|---|---|---|---|
| | pH | $COD_{Mn}$ | Phenol | Cyanogen | Thiocyanogen | $BOD_5$ |
| Waste water | 8.0 to 8.5 | 1500 to 2000 | 480 to 560 | 5 to 15 | 130 to 170 | 1230 to 1720 |
| Effluent | 7.0 to 7.3 | 95 to 105 | <0.1 | <1 | <1 | <5 |

From the Table 14, it is clarified that the addition of the fine powder of the granulated blast furnace slag to the aeration tank makes it possible to treat the ammonia liquors with a high load of from 3.5 to 4.0 Kg/m³·day of the COD volume loading within a short time of from 4.4 to 6.7 hours.

The process of the present invention employing the granulated blast furnace slag as the fixing carrier of the activated sludge is remarkably effective in improving the quality of the activated sludge effluent and the settleability of the activated sludge and also is remarkably effective in preventing the bulking of the activated sludge. Further, the process of the present invention makes it possible to cut the treatment time as much as about ½ to ¼ of that required in the conventional activated-sludge treatment in which the granulated blast furnace slag is not employed, thereby making it possible to increase the treatment efficiency and also possible to make the treatment installation more compact.

Further, the process of the present invention employing the ceramic cassettes 1 consisting mainly of the granulated blast furnace slag, as the fixing carrier for the activated sludge has the following effects:

(1) In contrast with the uniformly-mixed type activated-sludge treatment of the sewage or industrial waste water, in the process of the present invention, it is not required to uniformly mix the activated sludge in the biochemical-reaction tank of aeration tank. All that is required in the process of the present invention is to dissolve oxygen in the sewage or industrial waste water and to allow the sewage or industrial water to pass through the tanks, so that the energy for feeding the aeration air may be conserved in the process of the present invention in comparison with the conventional process, (2) Since the ceramic material consisting mainly of the granulated blast furnace slag is excellent in the properties for maintaining the activated sludge, the activated sludge is not substantially carried to the effluent, which makes it possible to eliminate or simplify the sludge thickener employed in the conventional activated-sludge treatment;

(3) Even when the treatment with a load of a BOD volumeloading of about 3 times as large as that of the conventional activated-sludge treatment is carried out, it is possible to maintain the quality of the effluent in good condition. Consequently, it is possible to realize a considerable compactness of the biochemical-reaction tank or aeration tank;

(4) Since it is possible to eliminate of simplify the sludge thickener, and also possible to realize a considerable compactness of the biochemical-reaction tank or aeration tank, it is possible to realize a considerable compactness of the sewage-treatment installation as a whole; and (5) Since the activated sludge is fixed inside the ceramic material, the bulking of the activated sludge which readily occurs in the conventional uniformly-mixed type activated-sludge treatment is prevented from occurring, so that the treatment is conducted in a stable manner to enhance the quality of the effluent.

What is claimed is:

1. A process for subjecting sewage or industrial waste water to an activated sludge treatment, in which the activated sludge treatment is carried out in such a manner that the concentration of activated sludge in an aeration tank of an activated sludge treatment plant is maintained at a high level so that the efficiency of the treatment may be improved, comprising the steps of:

adding a fine powder of granulated blast furnace slag to an aeration tank of an activated sludge treatment plant in an amount of from 1 to 5% by weight per unit of the aeration tank volume as fixing carrier for fixing activated sludge present in the aeration tank, said fine powder of the granulated blast furnace slag having a particle size of from 0.02 to 0.5 mm such that the adherability of the activated sludge to the fine powder and the dispersibility of the fine powder in the aeration tank are greatly improved, and introducing air in said aeration tank and controlling the amount of aeration air introduced therein to maintain the oxidation-reduction potential of the contents of said aeration tank at a level within a range of from +50 to +150 mV as measured by the use of an Au/Ag-AgCl electrode, while sewage or industrial waste water is supplied into the aeration tank.

2. A process for subjecting sewage or industrial waste water to a fixed-bed type activated sludge treatment, in which biochemical treatment of the sewage or industrial waste water is carried out by usign a fixed-bed type reactor containing at least one fixing carrier, to which activated sludge has been fixed thereto, wherein the fixing carrier is made of ceramic material, which is mainly comprised of granulated blast furnace slag in an amount of 50–90% by weight of the raw material of the ceramic material, said fixing carrier further being a cassette having a plate-like form constructed of a porous ceramic material of a fixing article with which the cassette is filled and which article is selected from a group consisting of (a) a plate-like porous ceramic material, (b) a chip-like ceramic material, (c) a saddle-shaped ceramic material and (d) a ring-like ceramic material; said process comprising the steps of:

setting the cassette having the plate-like form constructed of porous ceramic material or the cassette filled with at least one of the fixing article at the fixed-bed type reactor, fixing the activated sludge to the cassette having the plate-like form or the cassette filled with at least one of the fixing articles, introducing sewage or industrial waste water into the fixed-bed type reactor, while an aeration is carried out in the fixed-bed type reactor in such a manner that the amount of air employed in the fixed-bed type reactor is controlled to maintain the oxidation-reduction potential of the thus treated effluent, which has been subjected to such a biochemical treatment in the fixed-bed type reactor, at a level within a range of from 0 to +150 mV as measured by the use of an Au/Ag-AgCl electrode at an outlet of the fixed-bed type reactor.

3. A process for subjecting sewage or industrial waste water to a fixed-bed type activated sludge treatment comprising the steps of:

arranging a plurality of cassettes across a stream of the sewage or industrial waste water, said cassettes serving as fixing carriers for the activated sludge, said cassettes being plate-like porous ceramic articles mainly composed of granulated blast furnace slag or said cassettes being filled with ceramic materials mainly composed of granulated blast furnace slag, whereby a biochemical treatment of the sewage or industrial waste water is conducted for a predetermined period of time;

removing, among said cassettes, one cassette located in first position nearest an inlet side of the sewage or industrial waste water, as it becomes clogged, while the remaining cassettes are sequentially moved toward said inlet side of the sewage or industrial waste water in a parallel manner, as they become clogged;

mounting a new cassette or a renovated cassette in the last position of said cassettes thus cleared by the above sequential movement of said remaining cassettes;

removing deposits of said one cassette therefromto renovate said one cassette, to make it possible that said one cassette is mounted in said last position of said cassettes;

whereby said biochemical treatment of the sewage or industrial waste water is continuously conducted while said plurality of cassettes are sequentially replaced with renovated cassettes, thereby ensuring that the plurality of cassettes remain essentially unclogged.

* * * * *